Sept. 12, 1967     M. GARFINKLE     3,340,921
PNEUMATIC ANTI-SKID VEHICLE TIRES
Filed Oct. 14, 1965     3 Sheets-Sheet 1

INVENTOR.
MARVIN GARFINKLE
BY *McCoy, Greene,*
*Medert & Te Grotenhuis*
ATTORNEYS

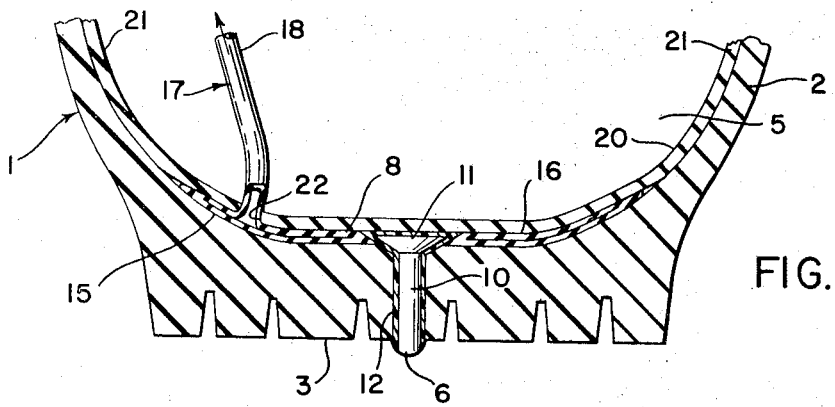
FIG. 5
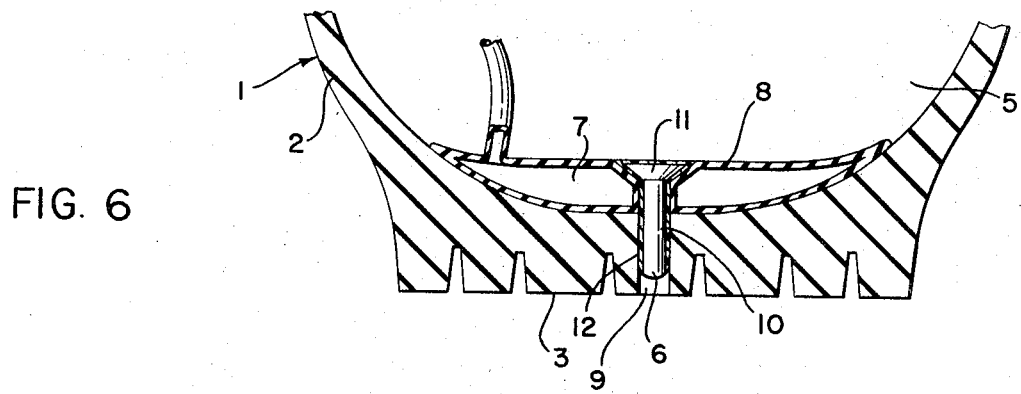
FIG. 6
FIG. 7
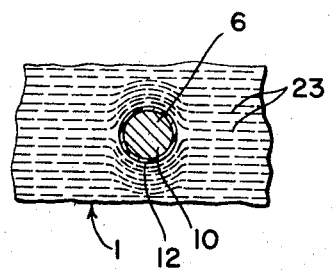
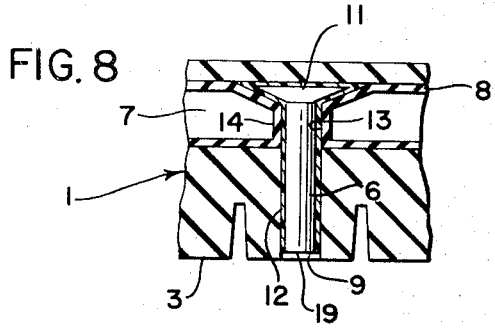
FIG. 8

United States Patent Office 3,340,921
Patented Sept. 12, 1967

3,340,921
PNEUMATIC ANTI-SKID VEHICLE TIRES
Marvin Garfinkle, 20606 Lorain Road,
Fairview Park, Ohio 44126
Filed Oct. 14, 1965, Ser. No. 496,024
5 Claims. (Cl. 152—208)

ABSTRACT OF THE DISCLOSURE

The pneumatic tire has primary and secondary annular inflatable chambers, and an inflatable bladder member in said secondary chamber adjacent the tread portion. Studs slidably received in apertures in the tread are adapted to be extended to engage the road when the air pressure in the secondary air chamber is reduced and are maintained in a nonroad-engaging position when inflation in the secondary air chamber is increased above a determined value. The bladder member is provided with apertures in radial alignment with the studs.

This invention relates to pneumatic tires for vehicles such as trucks, automobiles, and the like and more particularly to a controllable means whereby the tire will have improved traction on a road surface whenever the road condition is such as to require additional traction for preventing tire slippage.

Snow, ice, mud, and the like present serious problems to road vehicles. The most common method of overcoming them has been to surround the vehicle tire with a chain, however, such chains are difficult to mount and persons have sought satisfactory improvements. Permanently extended lugs of steel or other tough material have been employed, but have proven unsatisfactory in that they are easily damaged or quickly worn down, and often damage the road surface, create excessive noise, or fly out of the tire under centrifugal force during operation. Recognizing the unsatisfactory nature of these two anti-skid means, persons have long sought to provide a pneumatic tire having anti-skid studs which could be maintained in a retracted position under normal driving conditions and which could be extended to provide additional traction whenever warranted by slippery or otherwise adverse road surface conditions. Various devices of this sort have been conceived, but have failed to find commercial acceptance. Apparently this has been due to their complicated constructions which are impractical or expensive to manufacture and usually replete with springs or other metallic mechanical parts having a propensity to break, jam, or otherwise go afoul.

The present invention overcomes the disadvantages mentioned above and provides a pneumatic vehicle tire having a retractable auxiliary traction means mounted therein which is relatively inexpensive to manufacture, relatively trouble-free and easy to operate, and having anti-skid elements or studs which remain retracted for normal driving conditions, but which are controllable by the driver and are adapted to be extended when needed for traction.

It is among the objects of the present invention to provide a pneumatic tire for vehicles which may be used in a normal way when road conditions are favorable, but which has an auxiliary traction means mounted therein which is ready for instant use whenever road conditions are such that additional traction is needed.

Another object of the present invention is to provide a retractable auxiliary traction means for pneumatic vehicle tires which is durable and has a minimal number of metallic mechanical parts.

An even further object of the present invention is to provide a retractable auxiliary traction means for pneumatic tires which is relatively inexpensive to manufacture.

Yet another object of the present invention is to provide a retractable auxiliary traction means adapted for usage with a dual air chamber pneumatic tire of the type designed to reduce the danger from blowouts.

It is a still further object of the present invention to provide a retractable auxiliary traction means for pneumatic tires which is easy and convenient to operate.

These and other objects and advantageous features of this invention are more apparent from the following detailed description of several embodiments thereof taken in conjunction with the accompanying drawings, wherein like reference characters denote corresponding parts and wherein:

FIGURE 5 is a transverse fragmentary sectional view of the tire in FIGURE 3 but with studs in extended position;

FIGURE 6 is a transverse fragmentary sectional view of a tire which comprises the present invention with studs retracted and with a modified auxiliary traction means construction;

FIGURE 7 is a fragmentary sectional view of the portion of the tread surrounding a movable stud in a tire comprising the present invention and showing in detail how the tire cord may be arranged for strength; and FIGURE 8 is a fragmentary sectional transverse view of the tread portion of a tire comprising the present invention showing a modified flat-end stud.

Figure 1:
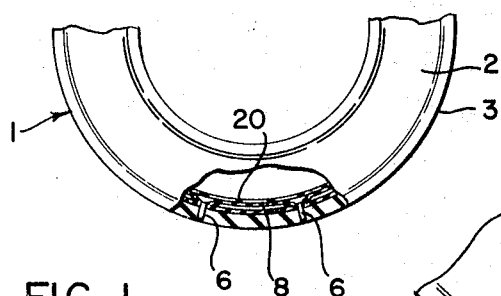
FIGURE 1 is a fragmentary sectional elevational view of a preferred embodiment of a tire which comprises the present invention, showing such tire with its anti-skid studs retracted.
Figure 2:
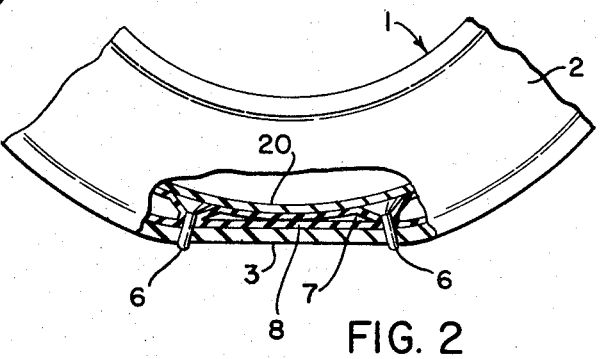
FIGURE 2 is a fragmentary sectional elevational view on an enlarged scale of the tire shown in FIGURE 1 but with its anti-skid studs in extended position.

Referring first to FIGURES 1 through 5 inclusive, there is illustrated a preferred embodiment of a pneumatic tire provided with retractable auxiliary traction means in accordance with the principles of the present invention. The tire has a tire casing 1 with relatively thin sidewalls 2 and a thick peripheral tread portion 3 which is of built-up laminated construction, as are the sidewalls, in accordance with current practice in the tire industry. The tire is of the tubeless variety, provided with an air valve (not shown) and mounted on a wheel rim 4 for inflation whereby air is maintained under pressure within the primary air chamber 5.

In accordance with the invention, the tread portion 3 comprises part of a novel assemblage which includes a plurality of retractable and extendable anti-skid elements or studs 6 which are maintained in retracted non-road surface engaging positions when the secondary air chamber 7 is expanded by inflation of a bladder member 8 and extend to protruding, road-surface engaging positions when the secondary chamber 7 contracts during deflation of the bladder member 8.

According to the principles of the present invention, the various anti-skid elements 6 are independent from one another, all of said elements being preferably duplicates of each other and working independently but generally in unison. The number of anti-skid elements may be chosen to provide the most desirable anti-skid qualities for various road conditions. Also, the particular disposition or arrangement of the independent elements 6 in the tread portion 3 may be varied. For example, as shown in the drawings, the individual anti-skid studs 6 are arranged in a single row extending about the circumference of the tire tread 3; or, the studs may also be arranged two abreast at the edges of the tread (not shown) or offset at the edges of the tread (also not shown).

The tread portion 3 of tire casing 1 is provided with a plurality of radially extending tread apertures 9 spaced at substantially equal intervals about the circumference of the tire in the center of the tread 3. Each tread aperture 9 is adapted to receive a single stud 6 having a relatively narrow cylindrical shank portion 10 and a relatively wide circular flanged head portion 11. The studs 6 are slidably received in the tread apertures 9 at their shank portions 10 with their flanged head portions 11 positioned radially inward of the tread portion 3. Tread apertures 9 are preferably formed slightly narrower than the shank portions 10 whereupon the stud shanks 10 may be forced tightly into place therein to mitigate against stones or dirt becoming lodged therebetween. The surfaces of stud shanks 10 are preferably provided with an antifriction coating such as a tetrafluoroethylene resin 12 to enable the stud shanks 10 to slide freely in their respective tread apertures 9. Each stud 6 is preferably formed of a highly abrasion resistant material.

In FIGURES 1 through 5, the secondary air chamber 7 is defined by the flexible, substantially annular bladder 8, which is preferably constructed of a rubber having a high resistance to flex cracking. The bladder 8 is disposed adjacent the radially inward surface of tire casing 1 adjacent the tread portion 3 and is provided with a plurality of radially extending bladder apertures 13 which are aligned with the tread apertures 9. The bladder apertures 13 are defined by the bladder aperture walls 14 which are continuous with radially outward bladder wall 15 and radially inward bladder wall 16 to seal off those bladder apertures 14 from the secondary air chamber 7. The bladder 8 is provided with an outlet 17 having a long neck 18 and a valve 19 mounted in and vented through the sidewall 2 of casing 1. The valve 19 may also be mounted in the tire rim 4 (as shown in phantom in FIGURE 3) or in other positions along the sidewall 2 or even through the tread which, although not shown, should be obvious to persons skilled in the art of tire construction. Similarly, the neck portion 18 could be mounted within the sidewall 2 of the casing 1; or, in a modification suitable for tires having innertubes, could be constructed to lie flush against the inner surface of sidewall 2 and between the tube and tire casing. The latter two modifications, while not shown, should be obvious to persons skilled in the art.

Figure 3:
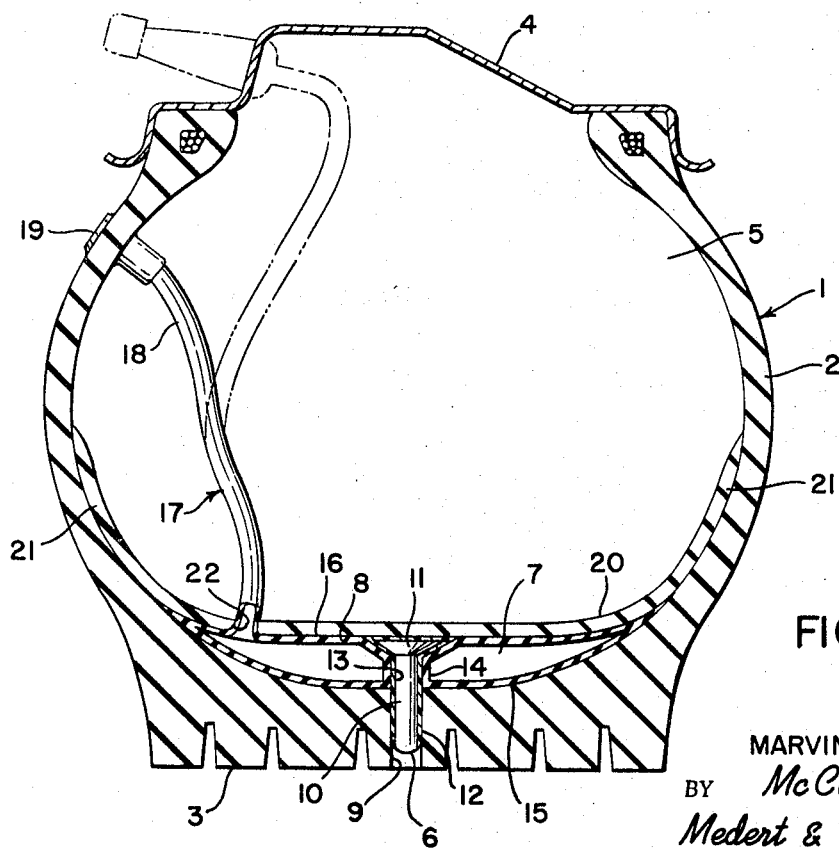
FIGURE 3 is a transverse fragmentary sectional view on an enlarged scale of a tire comprising the present invention in conjunction with a wheel rim and showing in detail the components of an auxiliary traction means and including a bladder member and an air stem for inflating and deflating the bladder member (an alternate construction for that air stem being shown in phantom)
Figure 4:
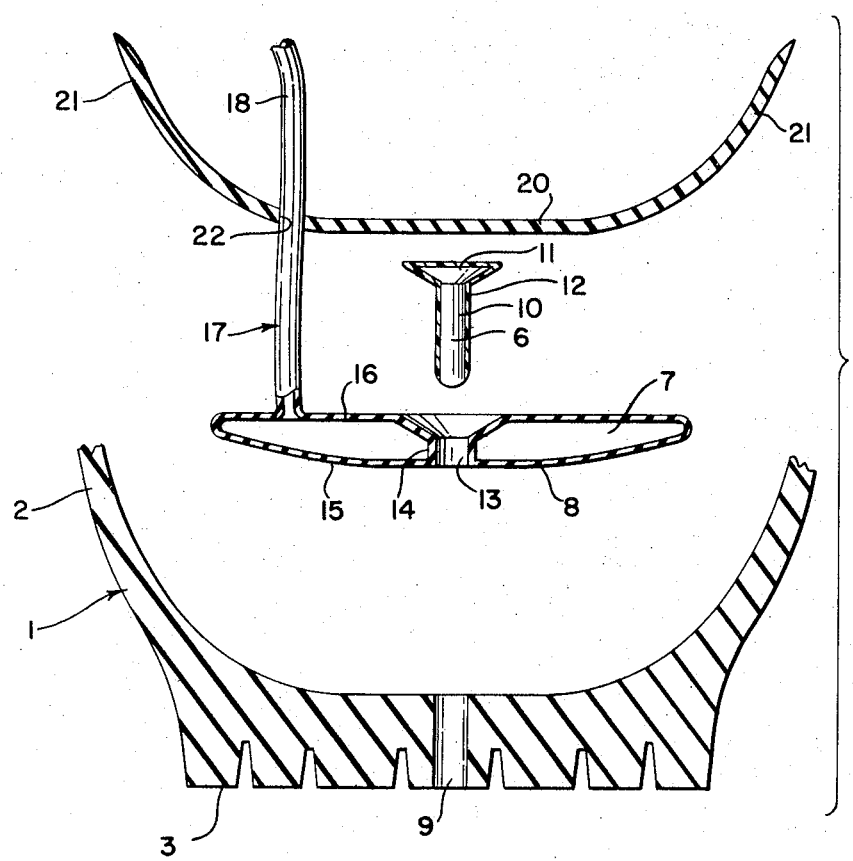
FIGURE 4 is an exploded transverse fragmentary sectional view of the tire in FIGURE 3.

As shown in FIGURE 3, the shank portions 10 of the studs 6 are disposed in the bladder apertures 13 and the flanged head portions 11 of the studs 6 engage the radially inward bladder wall 16. Thus, when the bladder 8 is inflated to expand the secondary air chamber 7, the studs 6 are supported at their flanged head portions 11 against the pressure exerted upon them by the primary air chamber 5 and tend to assume their retracted positions enclosed within the periphery of the tire tread 3 as shown in FIGURES 1, 3 and 5. As the bladder 8 is deflated, the secondary air chamber 7 contracts and air presure within the primary air chamber 5 tends to force the studs 6 radially outward to their extended road surface engaging positions where the ends of the stud shanks 10 will protrude from the tread apertures 9 beyond the periphery of the tread portion 3. As shown best in FIGURE 4, the radially inward bladder wall 16 may be offset at the edges of the bladder apertures 13 to conform to the contours of the stud heads 11.

As shown in FIGURES 1 through 5, a liner 20 is provided to overlay the bladder member 8 and stud heads 11, thus serving to hold these components in place prior to inflation of the primary chamber 5 and serving the further purpose of preventing air from escaping from the primary air chamber 5 through the tread apertures 9. The liner 20 preferably comprises a flexible band of rubber or rubberized fabric construction with inward curving edge portions 21 to conform to inner contours of the tire casing. Curved edge portions 21 are preferably bonded to the inner surfaces of the sidewalls 2, thus mitigating against a loss of air therebetween. It is contemplated, however, that an air-tight fit between the stud shanks 10, and the walls of the tread apertures 9 will obviate the necessity for a bond between the surfaces of the liner 20 and the sidewalls 2. In this case, the studs 6 and bladder 8 could be held in place by a form retaining liner of stiff rubber.

The liner 20 is provided with a bladder outlet aperture 22 through which the neck 18 of bladder outlet 17 extends. Preferably, the liner 20 and bladder outlet 17 form an air-tight fit at this point.

A modification is shown in FIGURE 6 wherein the liner 20 (as shown in FIGURES 1 through 5) is eliminated. Here, the adjoining surfaces of the stud heads 11 and the bladder 8 are adhered by suitable means. In addition, around each tread aperture, the radially outward surfaces of the bladder 8 are adhered to the inner surface of tire casing 1 adjacent tread portion 3. This adhesion holds the bladder 8 and the studs 6 in position when the tire casing is deflated and serves the further purpose of preventing air from escaping from the primary air chamber 5 through the tread apertures 9. Though various types of adhesive may be used, it is preferable to utilize one which will form an air-tight seal and yet which is relatively weak and easily separable. Since the studs in an inflated tire are under considerable pressure from the primary air chamber and press tightly against the bladder, the adhesive is primarily necessary to hold the bladder and studs in place prior to inflation of the tire. A weak adhesive will permit the bladder and stud assembly to be easily removed for cleaning, repair or to allow replacement of the studs, or even to allow reclaim of these parts after the tire casing has been worn out.

The apertures 9 formed in the treads of tires constructed in accordance with the teachings of the present invention need not cause those tires to be appreciably less durable than other tires. FIGURE 7 shows how the tire cords 23 (employed according to common practice in the industry) may be continuous and spread around the tread apertures 9. This construction eliminates the need to have discontinuous cords 23 at the tread apertures which could be a source of weakness.

The modification shown in FIGURE 8 employs an anti-friction element or stud 6 having a flat bottomed shank portion 19 in contrast with the round bottomed shanks 10 illustrated in FIGURES 1 through 6. It will be noted that the greatest forces acting upon the extended studs 6 when the tire is tending to slip on the road surface will be shear forces directed along the periphery of the tread 3 in a direction opposite to the direction of the tire's rotation. Flat bottomed studs as shown in FIGURE 8, have relatively sharp lead edges which tend to cut into the road surface. Thus, flat bottomed studs may be more effective on ice or other hard, slippery surfaces since only a very small extension of the stud is required to have it cut into the road surface and hold the tire from slipping further. Round bottomed studs, on the other hand, may be more suitable for mud and snow or other softer road surfaces, though they are also quite satisfactory for ice.

It will be noted that when the anti-skid tire of the present invention is not bearing the weight of a vehicle, deflation of the bladder member 8 may not result in the studs 6 assuming their operative extended positions, partially due to the lack of sufficient air pressure in the primary air chamber 5 to overcome the friction between stud shanks 10 and the walls of their respective tread apertures 9. This difficulty will be overcome when the tire is bearing the weight of the vehicle since the air pressure in the primary chamber 5 will be increased accordingly and the tread apertures will undergo minute deformations tending to allow the stud shanks to work free.

The auxiliary traction means of the present application is particularly suited for use in a dual air chamber safety tire of the type having independent outer and inner air chambers and designed to reduce the dangers resulting from blowouts. It will be apparent that the present traction means could be installed in the radially outer chamber of such a tire in substantially the same manner as shown in FIGURES 3 and 6. In addition, it may be preferable to eliminate the bladder member 8 and the inner tread wall 10, and to suitably bond head portion 20 of each stud 6 to the radially outer surface of the inner air chamber in such a dual chamber safety tire. In this instance, the outer chamber would serve as the secondary compressed air chamber of the present application. The studs 6 would be extended by deflating the outer chamber of the safety tire.

It is understood that, in accordance with the provisions of the patent statutes, variations and modifications of the subject invention may be made without departing from the spirit thereof.

Having thus described my invention, what I claim is:

1. A pneumatic anti-skid vehicle tire comprising
   (a) a tire casing defining a primary chamber adapted for inflation when mounted upon a wheel rim, said tire casing including a peripheral tread portion having a plurality of circumferentially spaced radially extending tread apertures;
   (b) inflatable means defining a secondary chamber within said tire casing, said means being controllably deflatable independently of said tire casing and comprising a substantially annular bladder member disposed within said tire casing adjacent said tread portion, said bladder member provided with a plurality of bladder apertures in radial alignment with said tread apertures; and
   (c) a plurality of studs slidably received in said tread apertures, said studs adapted for movement between extended road surface engaging positions and retracted non-road surface engaging positions, said studs adapted to assume said extended positions when said means is deflated to less than a predetermined volume, said studs adapted to assume said retracted positions when said means is inflated to greater than a predetermined volume, each of said studs being disposed within an aligned pair of tread and bladder apertures and having a flanged head portion radially inward of said bladder member.

2. A pneumatic anti-skid vehicle tire as recited in claim 1 wherein
   (a) said flanged head portions of said studs are adhered to said bladder member; and wherein
   (b) said bladder member is adhered to said tire casing.

3. A pneumatic anti-skid vehicle tire as recited in claim 1 wherein an annular inner lining is provided to cover the radially inward surface of said bladder member, said liner having a width greater than that of said bladder member.

4. A pneumatic anti-skid vehicle tire as recited in claim 1 wherein a flexible annular air-impermeable lining is provided to overlay the radially inward surface of said bladder member, said lining being adhered to said tire casing adjacent the axially outer edges of said bladder member.

5. A pneumatic anti-skid vehicle tire as recited in claim 1 wherein said bladder apertures are defined by bladder aperture walls which are integral with the radially outward and the radially inward walls of said bladder, whereby said bladder aperture does not communicate with adjacent portions of said secondary chamber.

References Cited

UNITED STATES PATENTS 2,672,908   3/1954   Donegan _____ 152—208

ARTHUR L. LA POINT, *Primary Examiner.*

C. W. HAEFELE, Y. P. SCHAEVITZ,
*Assistant Examiners.*